Patented Oct. 17, 1922.

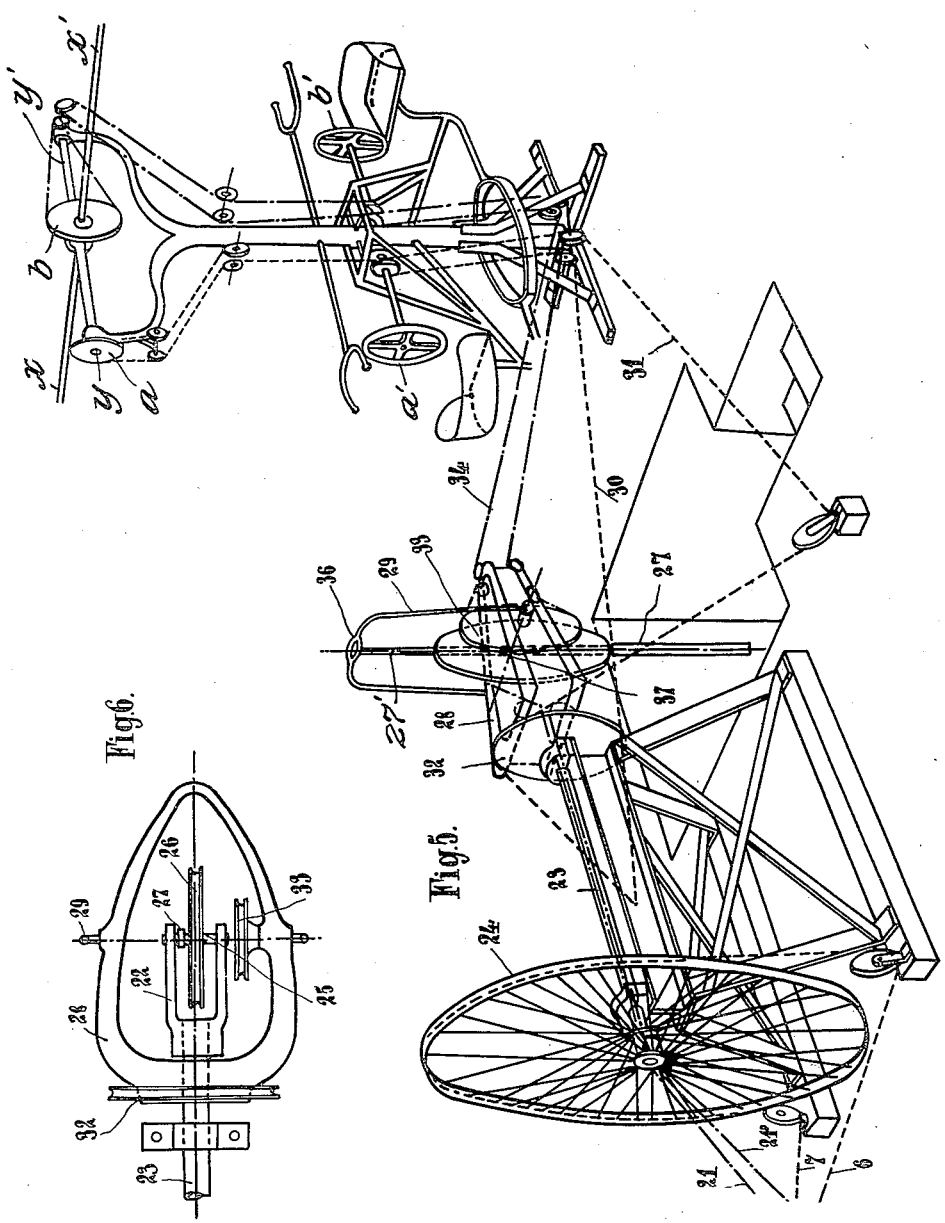

1,432,659

UNITED STATES PATENT OFFICE.

ADRIEN CLAUDE ANTOINE MARIE BOCHET, OF PARIS, FRANCE.

DEVICE FOR AIMING AT AERIAL OBJECTS.

Application filed March 23, 1921. Serial No. 454,951.

*To all whom it may concern:*

Be it known that I, ADRIEN CLAUDE ANTOINE MARIE BOCHET, a citizen of the Republic of France, and resident of Paris, France, (post-office address 1 Rue Montgolfier), have invented a new and useful Improved Device for Aiming at Aerial Objects (for which I have filed application in France July 4, 1919), which device is fully set forth in the following specification.

This invention relates to the adaptation to search lights on cradles, chiefly used in the army, of a cable control device enabling the search light to be operated from a distance by means of a lever, the angular movements of which are reproduced exactly by the search light.

The accompanying drawings illustrate by way of example a search light on a supporting cradle, to which has been applied the aiming device forming the subject of the invention.

Figure 1:
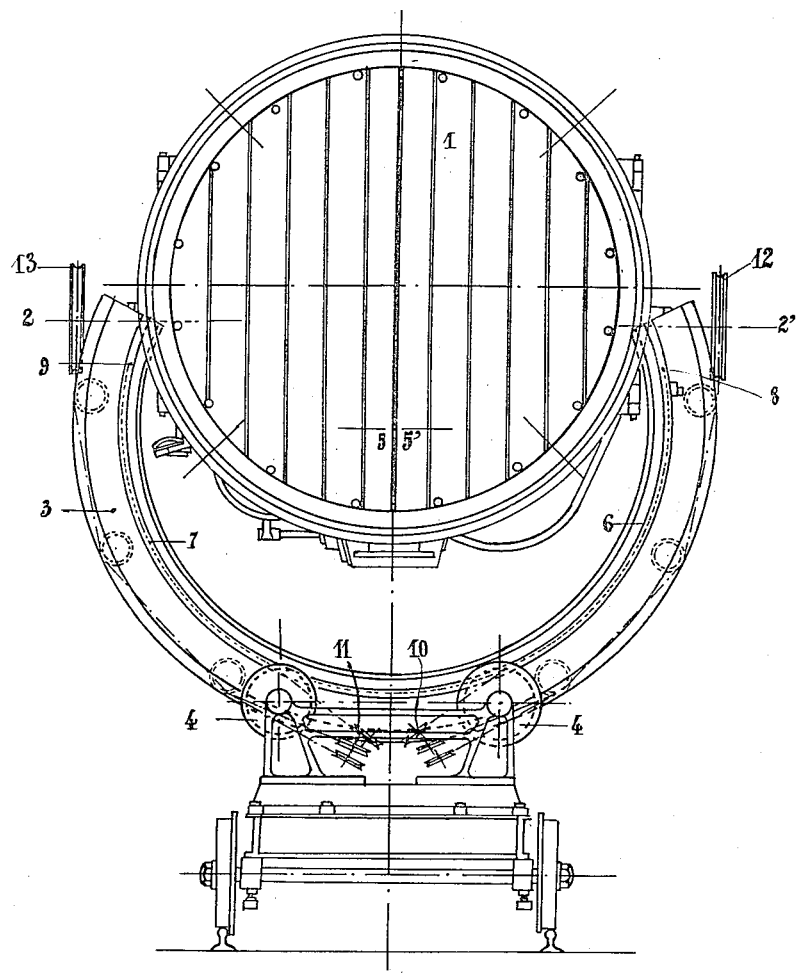
Figure 2:
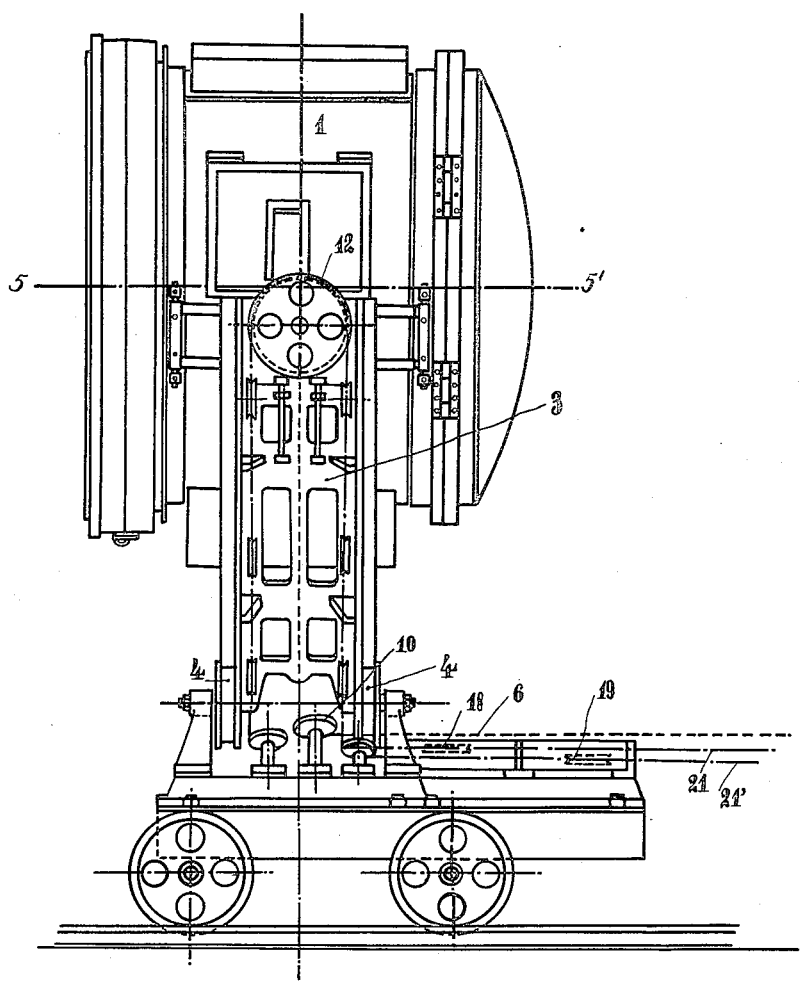

Figure 1 is a front elevation of the search light,

Figure 2 a side elevation and

Figure 3:
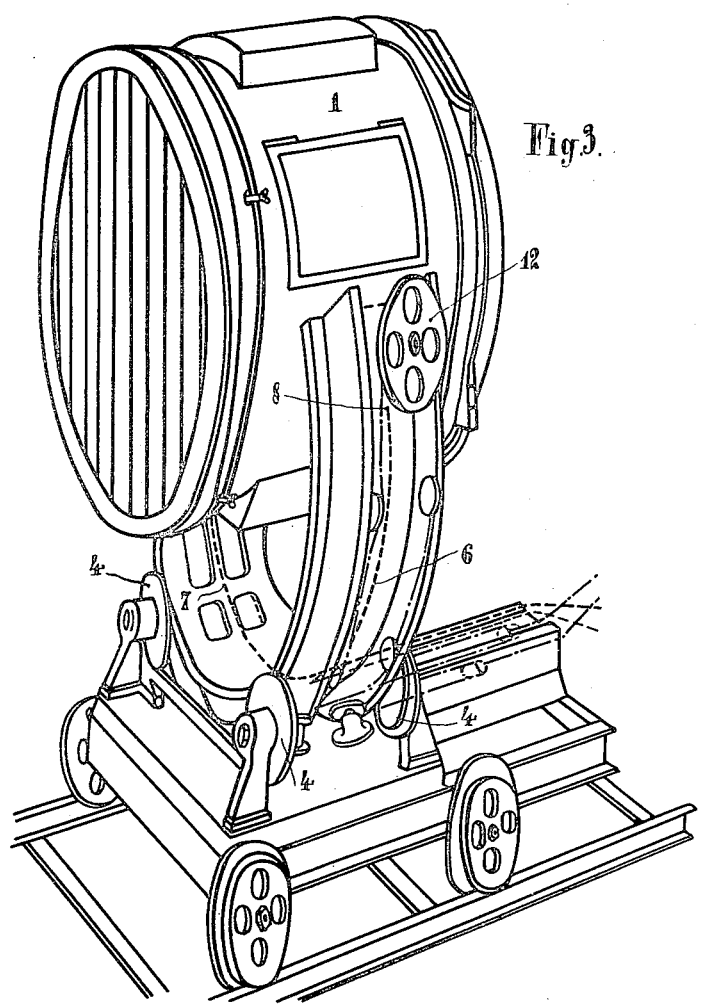

Figure 3 a perspective view of the search light.

Figure 4:
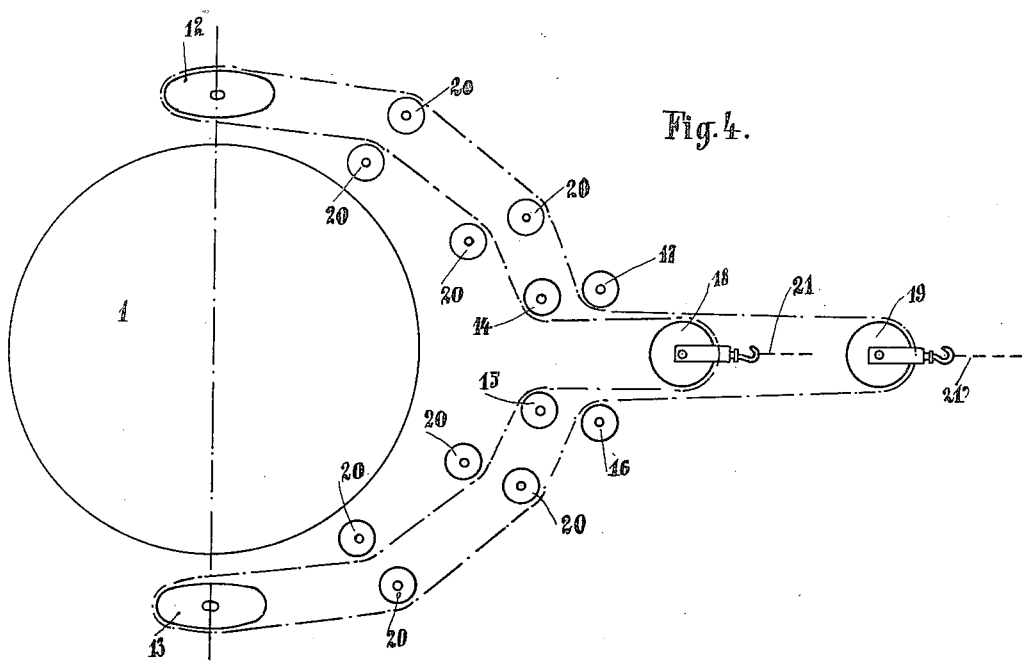

Figure 4 is a diagrammatic view of the portion of the cable control belonging to the search light, Figure 5 is a perspective view showing the arrangement of the operating post and the listening apparatus, Figure 6 is a plan of one of the parts of the operating post, producing repetition of the movements of the listening apparatus.

The search light 1 is supported by means of its trunnions in an arcuate cradle 3 to rock about an axis $2-2^1$ (Fig. 1), said cradle revolving on four rollers about a horizontal axis $5-5^1$ 4. The revolving movement of the cradle produces therefore a rotation of the search light about the horizontal axis $5-5^1$ which is at right angles to the axis $2-2^1$.

The cradle is operated by means of cables 6 and 7 (Figures 1-3) secured to it at 8 and 9 (Figure 1) and passing over pulleys 10 and 11 (Figures 1 and 2).

By pulling one of the cables 6 or 7, the cradle, and therefore the search light, will be rotated about the axis $5-5^1$ in one or in the other direction.

The turning of the searchlight about the axis $2-2^1$ is effected by means of an endless cable secured to pulleys 12, 13 keyed to extensions of the trunnions of the search light (Fig. 4).

Figure 4 shows diagrammatically the arrangement adopted for this control in order to ensure complete independence of the movements about the two axes $5-5^1$ and $2-2^1$.

The endless cable driving the pulleys 12 and 13, shown in perspective in the diagram for the sake of greater clearness, passes over fixed guide pulleys 14, 15, 16, 17 and movable pulleys 18 and 19 provided with shackles. The cable is guided on the periphery of the cradle by means of rollers 20.

The movement of the pulleys 18 and 19 under the action of the control cables 21 and 21′, produces the movement of the search light about the axis $2-2^1$ in one or in the other direction.

It must be pointed out that a rotation of the cradle about the axis $5-5^1$ causes the endless cable to travel on the pulleys 14, 15, 16, 17, 18 and 19, without producing any longitudinal movement of the latter two pulleys.

The independence of the movements about the two axes $5-5^1$ and $2-2^1$ is thus ensured.

The pulleys 18 and 19 are guided in their longitudinal movements as shown in Figure 2.

It follows from the preceding that the search light can be moved in any direction by acting on the cables 6, 7, 21, 21′; bearing in mind that the first two (cables 6 and 7) control the movement of the cradle, while the other two (cables 21 and 21′) control the turning of the search light itself in the cradle. This action is exercised by means of parts from the operating post (Figure 5) arranged at a suitable distance from the search light.

The said post comprises a fork 22 secured to one end of the hollow shaft 23 (Fig. 6) provided at the opposite end with a grooved wheel 24 of a diameter equal to the diameter of winding of the cables 6 and 7 on the cradle of the search light, the said cables being secured to the said grooved wheel. Shaft 23 can rotate in suitable bearings. The fork 22 carries a spindle 25 to which are keyed a pulley 26 and the operating lever 27.

The cables 21 and 21′ pass through the hollow shaft 23 and are secured to the pulley 26, the diameter of which is equal to the diameters of the pulleys 12 and 13 of the search light. The axes of the spindles 23 and 25 are respectively arranged parallel to the axes 5—5¹ and 2—2¹.

In these conditions, the axis of the search light beam follows in all its movements the operating lever 27 to which it always remains parallel. By moving lever 27 (which is rigidly connected to the shaft 25 whereon the pulley 26 is keyed, as previously stated) in a plane parallel with that of the pulley, the said pulley is caused to turn and, by means of the cables 21 and 21' which move in the direction of rotation of the pulley, causes the search light to turn in one direction or the other about the axis 2—2¹. On the other hand, by moving the operating lever in a plane perpendicular to the first plane—i. e., in the plane of the grooved wheel 24—which is possible since the hollow shaft 23 carrying the lever 27 and the wheel 24 is capable of turning, traction will be exerted on the cables 6 and 7 and they will be caused to rock the cradle. Now since the wheels 24 and 26 are of selected diameters, and since the operating lever 27 is arranged parallel to the light beam in the initial position of the search light and cradle, it will be readily seen that the light beam will remain constantly parallel with said lever during its operation. It is therefore sufficient to aim at an object with the operating lever, which could be provided for the purpose with a suitable part such as an alidade or a telescope, in order to light said object.

But in order to locate the said object, it may be advisable to provide the gunner with indications collected by suitable apparatus such as a goniometer, listening device, telemeter etc. Utilization of a listening device is more particularly to be recommended. It could be effected as follows: The operating post is completed by a device repeating the movement of the listening apparatus (Figure 5) installed in the neighbourhood. This apparatus turns about a fixed horizontal axis $y-y'$ parallel to the axis 2—2¹ of the search light, and about a second axis $x-x'$ at right angles to the first. The listening apparatus as a whole forms no part of the invention in so far as the precise details are concerned; it being sufficient for present purposes to state that it is connected with the directing or aiming device or mechanism, and that its rotation about the axis $y-y'$ is effected by means of the wheel $a$, operated from the hand wheel $a'$, while its rotation about the axis $x-x'$ is effected by the wheel $b$ operated from the handwheel $b'$.

The movements about these two axes are respectively transmitted by cables to the repeating device which may comprise a frame 28 (Figures 5 and 6) rigidly attached to a pulley 32 and rotating with the hollow shaft 23 of the operating post about the fixed horizontal axis of said shaft, and a quadrant 29 secured to a pulley 33 and rotating about an axis normal to the axis of shaft 23.

The frame 28 is rotated by the cables 30 and 31 and pulley 32, and the quadrant 29 by the pulley 33 and cables 34 and 35, both pairs of cables leading to the listening apparatus to be operated by the mechanism thereof.

The quadrant 29 is provided in the centre with a ring 36 which, during the movements of the frame 28 and of the quadrant 29, defines an imaginary sphere having for its centre the point 37 about which rotates the operating lever 27.

The corresponding axes of rotation of the listening apparatus and of the repeating device being adjusted parallel to each other, it follows that the line joining the point 37 to the centre of the ring 36, will be always parallel to the direction of the air craft given by the listening apparatus.

By construction, the radius of the ring 36 and the radius of the sphere on which the said ring is moving, are in the proportion of the speeds of the aircraft and of the sound. The circumference of the ring 36 is therefore a geometrical locus of the point where the line going from the point 37 to the aircraft, passes through the aforesaid sphere; this in the case of the movement of the aircraft being followed by the listening apparatus, traveling on a sphere having for its centre the point 37.

If the gunner follows the centre of the ring 36 with the end of the pointer or hand 27' which forms an extension of the operating lever 27, the said hand will trace the trajectory of the aircraft on a sphere with the centre at 37.

By continuing the movement in the same direction, from the centre of the ring 36 to the circumference of the said ring, the gunner will cause the end of the pointer to describe the tangent to the end of the trajectory traced, which is a second locus of the tracing of the position of the aircraft.

By connecting the point of intersection of these two loci with the point 37 the direction where the aircraft really is will be obtained.

Consequently in order to get the beam on an aircraft held by the listening apparatus, it is sufficient to follow with the end of the pointer extension of the operating lever 27, the centre of the ring 36, then, at the moment when it is desired to light the said aircraft, to continue the movement in the same direction until the end of the pointer is brought to the circumference of ring 36. By uncovering at the same time the beam, the aircraft will be lighted. The observer then having his eyes turned precisely on it, will at once notice it and continue to follow it easily.

If the aircraft does not move on a sphere concentric with the ring 36, it will be nevertheless caught by the beam during the above described manoeuvre, but its direction will not strike then exactly the circumference of ring 36.

The application just described by way of example for the case of a search light and of a listening apparatus, could be carried out in similar conditions for any apparatus necessitating the same kind of aiming or sighting, and with utilization of suitable means of direction and correction as well as of different systems of mechanical or electric control.

When it is desired to be able to throw the beam at times on aerial objects, and at other times on objects close to the horizontal plane, the aiming device could be completed so as to make possible a rotation about a vertical axis.

By means of suitable control apparatus, the apparatus can then be moved either about a fixed horizontal axis and an axis perpendicular to the latter, or about a fixed vertical axis and a horizontal axis. This arrangement may be found suitable for instance for search lights installed on board ships, for watching an attacker travelling in the air or on the sea.

Having now particularly described and ascertained the nature of my said invention and in what manner the same is to be performed, I declare that what I claim is:—

1. In combination, a search light; controlling mechanism for directing the movements of the search light and including an operating lever; mechanism for locating an aerial object; and a device connected to automatically repeat the movements of the locating mechanism and including an element movable relatively to the operating lever to indicate the position to which said lever must be moved to direct the search light on said object.

2. In combination, a search light; controlling mechanism for directing its movements and including an operating lever; and mechanism for locating a distant aerial object having means connected with it for automatically indicating the position to which said lever must be moved to direct the search light on said object.

3. In combination, a search light; controlling mechanism for directing its movements and including an operating lever provided with a pointer, mechanism for locating a distant aerial object; and a member connected to be operated by said locating mechanism in accordance with its movements and provided with a part cooperative with said pointer to indicate the position to which the operating lever must be moved to direct the search light on said object.

4. In combination, a search light; controlling mechanism for directing its movements and including an operating lever provided with a pointer; mechanism for locating a distant aerial object; and a device connected to automatically repeat the movements of the locating mechanism and including a member provided with a part cooperative with said pointer to indicate the position to which the operating lever must be moved to direct the search light on said object.

5. In combination, a search light; controlling mechanism for directing its movements and including an operating lever; mechanism for locating a distant aerial object; and a device connected to automatically repeat the movements of the locating mechanism and comprising a frame adapted to rock about a fixed horizontal axis and a member connected to said frame and adapted to rock about an axis perpendicular to the first axis, said member having a part cooperative with said lever to indicate the position to which it must be moved to direct the search light on said object.

6. In combination, a search light; and controlling mechanism for directing its movements, comprising separate cable connections for turning the search light about two axes perpendicular to each other, one of which axes is fixed and horizontal, a pair of wheels to each of which the terminals of one cable connection are fastened, and an operating lever common to both wheels.

7. In combination, a search light; and controlling mechanism for directing its movements, comprising separate cable connections for turning the search light about two axes perpendicular to each other, a hollow shaft through which one cable connection is inserted, a wheel connected to the rear end of said shaft and to which the terminals of said cable connection are attached, a wheel connected to the front end of said shaft and disposed in a plane perpendicular to that of the first wheel, the second wheel having the terminals of the other cable connection attached to it, and a single operating lever common to both wheels.

8. In combination, a search light; a vertically-arranged arcuate cradle wherein the search light is mounted to rock about a fixed horizontal axis; a base whereon said cradle is rotatably supported at its periphery to rock the search light about an axis perpendicular to the first axis independently of its movement about the latter axis; and a controlling device for effecting said independent movements.

9. In combination, a search light; a vertically-arranged, arcuate cradle wherein the search light is pivotally mounted to rock about a fixed horizontal axis; a supporting base; rollers mounted thereon and on which the cradle is rotatably supported to rock the search light about an axis perpendicular to the first axis; a cable connection having its terminals connected to the opposite arms of the cradle to rotate the latter and the search light about the second axis; a wheel fixed to each pivot or trunnion of the search light; a cable connection led around both wheels to rock said search light about the first axis; and means for operating said cable connections.

In testimony whereof I have have signed this specification in the presence of two subscribing witnesses.

ADRIEN CLAUDE ANTOINE MARIE BOCHET.

Witnesses:
FERNAND DU FOUR,
PIERRE MARUAND.